United States Patent
Jain et al.

(10) Patent No.: US 9,738,339 B1
(45) Date of Patent: Aug. 22, 2017

(54) SIDE STAND INDICATOR FOR A TWO-WHEEL VEHICLE

(71) Applicant: Texas Instruments Incorporated, Dallas, TX (US)

(72) Inventors: Sanjay Jain, Pune (IN); Abhijeet Gopal Godbole, Solapur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/087,035

(22) Filed: Mar. 31, 2016

(51) Int. Cl.
*B62H 1/02* (2006.01)

(52) U.S. Cl.
CPC ........... *B62H 1/02* (2013.01); *B62H 2700/00* (2013.01)

(58) Field of Classification Search
CPC .............................. B62H 1/02; B62H 2700/00
See application file for complete search history.

(56) References Cited

U.S. PATENT DOCUMENTS

| | | | | |
|---|---|---|---|---|
| 6,733,025 B2 * | 5/2004 | Su | | B62H 1/02 180/219 |
| 7,514,919 B2 * | 4/2009 | James | | G01D 5/204 324/207.17 |
| 2014/0132253 A1 * | 5/2014 | Bertin | | G01D 5/2086 324/207.17 |
| 2014/0139217 A1 * | 5/2014 | Vaysse | | G01R 33/34046 324/318 |
| 2015/0022190 A1 * | 1/2015 | Taylor | | H03B 7/06 324/207.15 |
| 2015/0170625 A1 * | 6/2015 | Clark | | G10H 1/0091 84/737 |
| 2015/0362340 A1 * | 12/2015 | Montagne | | G01D 5/225 324/207.17 |
| 2016/0169717 A1 * | 6/2016 | Zhitomirsky | | G01D 5/20 702/94 |

* cited by examiner

*Primary Examiner* — Kevin Hurley
(74) *Attorney, Agent, or Firm* — John R. Pessetto; Charles A. Brill; Frank D. Cimino

(57) ABSTRACT

A two-wheel vehicle includes a frame and a metallic side stand, rotatable within a bracket attached to the frame. The metallic side stand is rotatable between a first position that supports the two-wheel vehicle when parked and a second position substantially adjacent the frame. The two-wheel vehicle also includes an inductive sensor attached to the two-wheel vehicle and connected to detect at least one position of the metallic side stand and a circuit connected to receive an output from the inductive sensor and to provide a signal that reflects the position of the side stand.

6 Claims, 3 Drawing Sheets

SIDE STAND INDICATOR FOR A TWO-WHEEL VEHICLE

FIELD OF THE DISCLOSURE

Disclosed embodiments relate generally to the field of two-wheel devices. More particularly, and not by way of any limitation, the present disclosure is directed to a side-stand indicator for a two-wheel vehicle.

BACKGROUND

Two-wheel vehicles usually have a side stand mounted on the left-hand side to support the vehicle when parked; the side stand then folds upward against the frame for travel. When a side stand is inadvertently left down in a parking position during travel, contact of the side stand with the ground, e.g., during a left-hand turn, can result in loss of control of the vehicle and serious injury to the rider(s). To avoid this error, motorized two-wheel vehicles are often equipped with a sensor to detect when the side stand is properly stowed prior to travel. The signal received from the side-stand sensor can be informative only or can be used, for instance, to prevent the vehicle from operating when the side stand is down.

Sensors currently used to detect the position of the side stand are magnetic sensors, such as Reed switches and Hall elements. Use of these sensors requires mounting a target, e.g., rare earth magnets and magnet holders, on the side stand, while the Reed switch or Hall element is mounted to the frame of the vehicle. Both the magnets and the sensors that recognize their presence are sensitive to wear and tear; particularly when the part is mounted to the moving side stand, as the magnets generally are. Loss of magnet results, at a minimum, in the side stand sensor being ineffective, which as previously noted, may cause loss of control of the vehicle or injuries to the rider if the side stand is not properly stowed. Some two-wheel vehicles may have a feature that does not allow the vehicle to start if the side stand is not properly stowed. As loss of magnet makes the entire side stand sensor assembly non-functional, the user may need to buy an entire sensor assembly again, which adds to cost and vehicle down time.

SUMMARY

Disclosed embodiments use inductive sensors to determine whether the side stand is properly stowed. Inductive sensors detect metal objects, so that the side stand itself can serve as the target. This allows the sensor to be operable without adding an additional target to the side stand. The proposed side stand sensor can be implemented in at least two ways: a) detecting the presence or absence of the metallic side stand adjacent the inductive sensor or b) detecting the strain in a spring attached to the side stand and translating that strain into a determined position.

In one aspect, an embodiment of a two-wheel vehicle is disclosed. The two-wheel vehicle includes a frame; a metallic side stand, rotatable within a bracket attached to the frame, the metallic side stand rotatable between a first position that supports the two-wheel vehicle when parked and a second position substantially adjacent the frame; an inductive sensor attached to the two-wheel vehicle and connected to detect at least one position of the metallic side stand; and a circuit connected to receive an output from the inductive sensor and to provide a signal that reflects the position of the side stand.

In another aspect, an embodiment of a side-stand detector for a two-wheel vehicle is disclosed. The side-stand detector includes an inductive sensor configured for attachment to the two-wheel vehicle to detect at least one position of the side stand; and a circuit connected to receive an output from the inductive sensor and to provide a signal that reflects the position of a side stand.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. The embodiments shown in the figures are meant as examples only and should not be taken as limiting.

Figure 1:
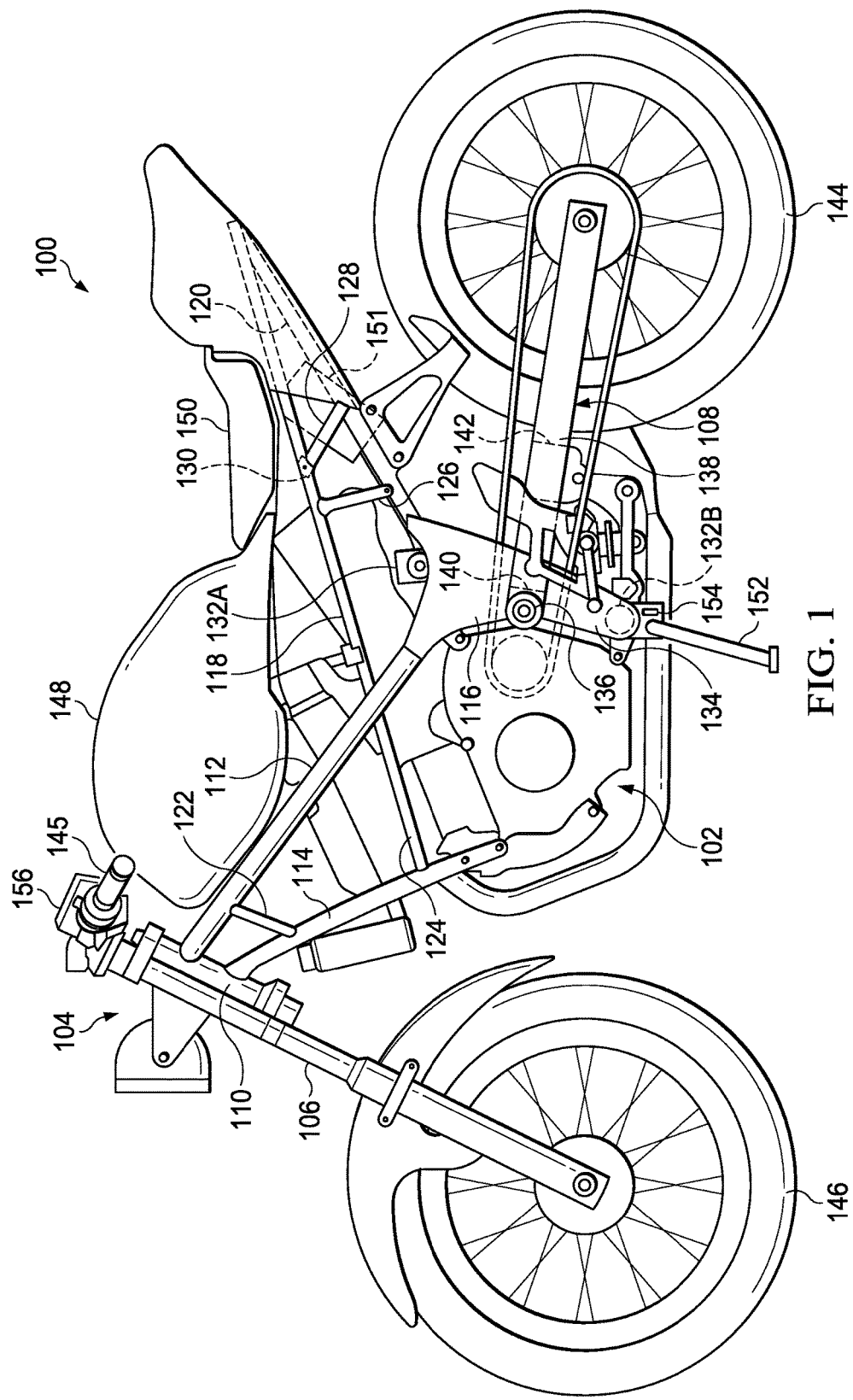
FIG. 1 provides a perspective of an example two-wheel vehicle with a side-stand sensor according to an embodiment of the disclosure.

Referring now to FIG. 1, a left side view of a Two-Wheeled Vehicle 100 is depicted according to an embodiment of the present disclosure. Two-Wheeled Vehicle 100 in this embodiment is a motorcycle having an Engine 102 (e.g., an internal combustion engine) disposed at the center portion of a Vehicle Body Frame 104, a Front Fork 106 that is steerably supported at the front end of Vehicle Body Frame 104, and Swing Arm 108 that is supported at the lower, rear portion of the vehicle body frame so as to be moveable in the up-and-down direction.

Vehicle Body Frame 104 is configured to have Head Pipe 110 for steerably supporting Front Fork 106, a pair of right and left Main Frames 112 extending from the upper portion of Head Pipe 110 downwards and rearwards, a pair of right and left Down Frames 114 extending from the lower portion of Head Pipe 110 downwards and rearwards, a pair of right and left Center Frames 116 extending from the rear ends of Main Frames 112 downwards at an intermediate portion in the front-and-rear direction of the vehicle, a pair of right and left Seat Rails 118 extending upwards and rearwards from the rear portions of Main Frames 112 to the rear portion of the vehicle, and a pair of right and left Sub Frames 120 for joining the upper rear ends of Main Frame 112 to the rear ends of Seat Rails 118.

Reinforcing Frames 122, 124 join Main Frames 112 and Down Frames 114 and Reinforcing Frames 126, 128 join Seat Frames 118 and Sub Frames 120. Respective Reinforcing Frames 122, 124, 126, 128 are provided as left-and-right pairs. A Seat Lower Cross Member 130 joins the right and left Seat Rails 118; Upper Cross Member 132A joins right and left Center Frames 116; and Lower Cross Member 132B joins the lower portions of the right and left Center Frames 116. The right and left Center Frames 116 have plate-like Pivot Portions 134 extending downwardly from the upper portions at which Main Frames 112 and Seat Rails 118 are joined to one another, respectively. Pivot Portions 134 are provided as a right-and-left pair, and Pivot Shaft 136 penetrates through the intermediate portions of the right and left Pivot Portions 134 in the up-and-down direction so as to freely pivotably support Swing Arm 108. Pivot Shaft 136 is disposed in parallel to the width direction of the vehicle.

Swing Arm 108 has a pair of right and left Arms extending in the front-to-rear direction, and the right and left Arms 138 are joined to each other by Front Cross Portion 140 and Rear Cross Portion 142. Pivot shaft 136 penetrates through the front end portions of Swing Arm 108. Rear Wheel 144 as a driving wheel is supported by the rear end of Swing Arm 108.

A Steering Handle 145 is secured to the upper portion of Front Fork 106, and Front Wheel 146 is secured to the lower portion of Front Fork 106. Dashboard 156 is attached to Steering Handle 145 to provide relevant information to the driver of the vehicle. Fuel Tank 148 for stocking fuel is disposed above Main Frames 112 so as to straddle the right and left Main Frames 112, i.e., Fuel Tank 148 is disposed above the front portion of the Vehicle Body Frame 104. A Seat 150 for a driver provided so as to straddle the right and left Seat Rails 118 is disposed above Seat Rails 118 continuously with the rear end of Fuel Tank 148. Battery 151 is disposed in a space surrounded by the right and left Seat Rails 118 and Sub Frames 120 below the rear portion of Seat 150.

Side stand 152, which is freely foldable, is secured to the lower end of the left-handed Center Frame 116, and Inductive Sensor Circuitry 154 is attached to the frame adjacent a closed position of the side stand to detect the presence of Side Stand 152 when in the closed position. For the purposes of this application, the "open" position of the side stand refers to the extended position of the side stand for supporting the two-wheel vehicle. The "closed" position of the side stand refers to the desired position of the side stand during travel, which is generally adjacent the body of the vehicle and horizontal to the ground. Side Stand 152 can include a spring (not specifically shown) attached to the side stand to urge the side stand into the open position. The spring is generally attached to a point that is somewhat offset from the pivot point of the side spring and can be adjacent or behind the side stand from the perspective shown.

Figure 2:
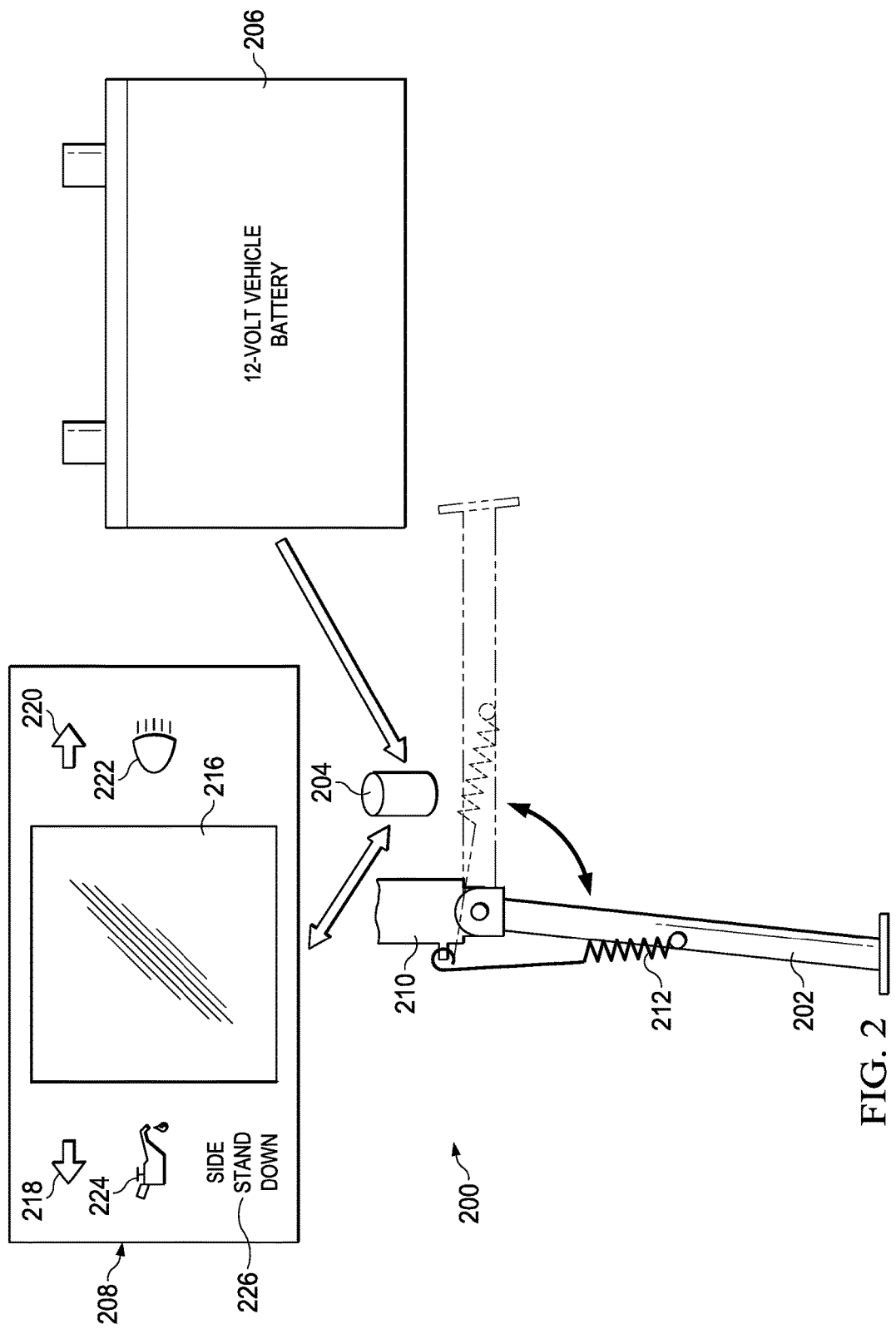
FIG. 2 depicts the elements of a side stand detection system according to an embodiment of the disclosure.

FIG. 2 depicts Side Stand Detection System 200 according to an embodiment of the disclosure. Side Stand Detection System 200 includes Side Stand 202, Inductive Sensor Circuitry 204, Vehicle Battery 206 and Dashboard 208. Side Stand 202 includes Bracket 210 for attachment of the side stand to a two-wheel vehicle and also includes Spring 212. Bracket 210 can be bolted to the frame of a two-wheel vehicle, such as a motorcycle, or can be affixed by other methods, e.g. welding. As seen in this figure, Side Stand 202 is rotatable from the open position illustrated here to the closed position shown by dotted lines. In the closed position, the side stand is generally placed in an essentially horizontal position adjacent a portion of the frame or other parts of the vehicle. Spring 212 has one end attached to Bracket 210 and a second end attached to the shaft of Side Stand 202 to urge Side Stand 202 into the extended position. It will be clear to one skilled in the art that the manner in which Spring 212 is attached to the Side Stand 202 and Bracket 210 causes the strain Spring 212 to be different when in the open position than when in the closed position. This difference in strain can be measured and used to determine the position of the spring.

Inductive Sensor Circuitry 204 includes two elements, which will be discussed in more detail below: a sensor and an analog front end (AFE). In the embodiment shown in this figure, both elements of Inductive Sensor Circuitry 204 are co-located in a single device, although in other embodiments, these two elements can be located separately. In at least one embodiment, Inductive Sensor Circuitry 204 is mounted, e.g., to Bracket 210 or to Frame 104, in a position where Side Stand 202 will be adjacent to Inductive Sensor Circuitry 204 when the side stand is in the closed position, but will not be adjacent Inductive Sensor Circuitry 204 when the side stand is in the open position. Inductive Sensor Circuitry 204 receives power from Vehicle Battery 206. Typically, the connection between Inductive Sensor Circuitry 204 and Vehicle Battery 206 is active whenever a key is inserted in the ignition and the vehicle is turned on. Inductive Sensor Circuitry 204 typically draws only a few milliamperes of power and provides a very low power solution. AFE 204 is also connected to supply a signal, e.g., to Dashboard 208, where the information carried by this signal can be presented to the driver of the vehicle.

In the embodiment shown, Dashboard 208 has a Main Screen 216 that can provide, e.g., speed of the vehicle, engine rotations per minute (RPM), data from a Global Positioning System (GPS), etc. Additional information can be provided by icons, which can be lit when necessary or desired to draw attention to the conditions they represent. In the embodiment shown, Dashboard 208 contains the following icons: Left Turn Signal 218 and Right Turn Signal 220, which mimic turn signals provided to following vehicles, High Beam Signal 222, which indicates when the high beams are engaged, Oil Pressure Indicator 224, which indicates when the oil pressure is low and Side Stand Indicator 226, which indicates when the side stand is down and the vehicle is powered on. It will be understood that these icons are shown for example only; different information can be provided or the same information can be provided in different ways.

Figure 3A:
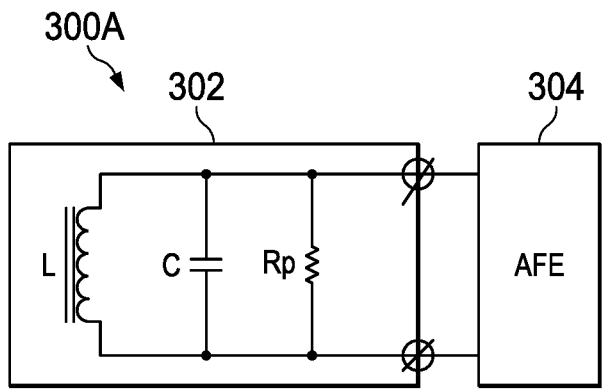
FIGS. 3A and 3B illustrate inductive sensor circuitry for a side stand according to two different embodiments of the disclosure.

FIG. 3A illustrates the components of one embodiment of Inductive Sensor Circuitry 300A, which can serve, for example, as the embodiments shown as Inductive Sensor Circuitry 154 and Inductive Sensor Circuitry 204. Inductive Sensor Circuitry 300A includes Inductive Sensor 302 and Analog Front End (AFE) 304. In the embodiment shown, Inductive Sensor 302 comprises an inductor-capacitor (LC) tank, although other sensing circuits can also be utilized. In at least one embodiment, Inductive Sensor 302 is a simple printed circuit board (PCB) coil with an attached capacitor. That is, Inductor L can be a PCB with a metal inductor printed thereon, although other types of inductive coils can also be used. AFE 304, sometimes also referred to as an analog front-end controller (AFEC), is a set of analog signal conditioning circuits that use operational amplifiers, filters, and sometimes application-specific integrated circuits to process the signals received from Inductive Sensor 302. AFE 304 provides a configurable and flexible electronics functional block that acts as an interface between Inductive Sensor 302 and other components of the system, e.g., by providing an indicator to Dashboard 208 when the side stand is not properly placed in a folded position for travel and the vehicle is on. In the embodiments shown in FIGS. 1 and 2, Inductive Sensor 302 and AFE 304 are co-located and are part of a single device. In at least one embodiment, Inductive Sensor 302 is located near Side Stand 202, while AFE 304 is placed elsewhere on the two-wheel vehicle, such as near the dashboard.

In at least one embodiment, AFE 304 is connected to Inductive Sensor 302 by wires and provides an alternating current (AC) to Inductive Sensor 302. As the AC current flows through Inductor Coil L, Inductive Sensor 302 generates an AC magnetic field. When a conductive material, such as the metallic side stand, is brought into the vicinity of Inductor Coil L, these magnetic fields will induce eddy currents on the metallic side stand. The eddy currents generate their own magnetic field, which in turn will change the original magnetic fields, thus impacting the parallel resonance impedance of the LC tank; the change in impedance is measured to detect the position of the side stand. Based on the metal composition of the side stand, a required angle of detection and the distance from the side stand, precise thresholds can be programmed into the AFE.

Figure 3B:
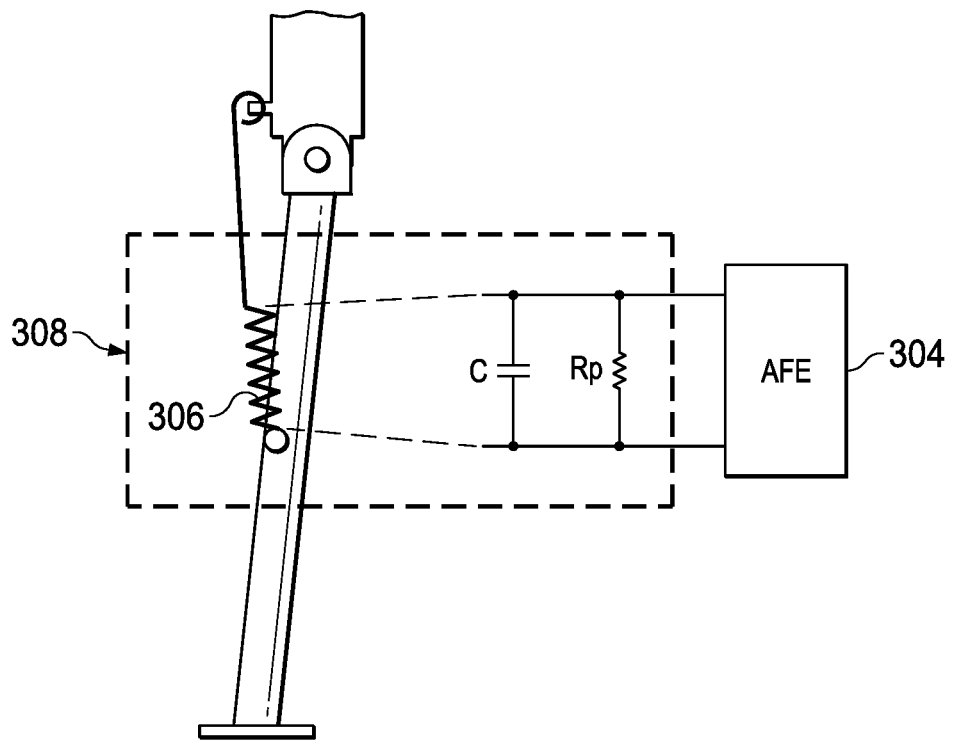

In an embodiment shown in FIG. 3B, differences in strain experienced at the spring attached to the side stand can be used to determine the position of the side stand. In Circuit 300B, Inductor L of the previous embodiment is replaced with connections to both ends of Spring 306. Capacitor C, coupled in parallel with Spring 306, forms Inductive Sensor 308, which measures strain in the spring and uses the amount of strain to determine the position of the side stand. The strain in the side stand spring is reflected as a change in inductance between the open position and the closed position of the side stand.

In at least one embodiment AFE 210 is the LMP91300 chip manufactured by Texas Instruments Incorporated. LMP91300 provides programmable thresholds, programmable temperature compensation and a programmable oscillation frequency range. The programmable thresholds can be used, for example, to translate the range of values provided by Inductive Sensor 202 into a range of angles in the side stand position that will trigger an indication that the side stand is down. In another embodiment, AFE 210 is the LDC1000 chip, also manufactured by Texas Instruments Incorporated. Other chips can also be utilized for AFE 210.

Applicant has disclosed a reliable, accurate sensing switch solution for providing side stand position information. In at least one embodiment, the disclosed solution is contactless, improving reliability over previous solutions. No magnets are required and in at least one embodiment, no components are mounted on moving parts, such as the side stand. Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A two-wheel vehicle comprising:
   a frame;
   a metallic side stand, rotatable within a bracket attached to the frame, the metallic side stand rotatable between a first position that supports the two-wheel vehicle when parked and a second position substantially adjacent the frame;
   an inductive sensor attached to the two-wheel vehicle and connected to detect at least one position of the metallic side stand; and
   a circuit connected to receive an output from the inductive sensor and to provide a signal that reflects the position of the side stand;
   wherein the inductive sensor is an inductor-capacitor (LC) tank.

2. The two-wheel vehicle as recited in claim 1 wherein the LC tank comprises a PCB coil.

3. The two-wheel vehicle as recited in claim 1 wherein the inductive sensor measures parallel resonance impedance within the LC tank to detect the presence of the side stand adjacent the sensor.

4. The two-wheel vehicle as recited in claim 3 wherein the circuit is programmable to set an angle at which the side stand is determined to be in the second position.

5. The two-wheel vehicle as recited in claim 1 wherein the inductive sensor comprises a capacitor connected in parallel to each end of a spring attached to the side stand and measures the strain in the spring to determine the position of the side stand.

6. A side-stand detector for a two-wheel vehicle, the side-stand detector comprising:
   an inductive sensor configured for attachment to the two-wheel vehicle to detect at least one position of the side stand; and
   a circuit connected to receive an output from the inductive sensor and to provide a signal that reflects the position of a side stand;
   wherein the inductive sensor is connected to a spring attached to each end of the side stand and measures the strain in the spring to determine the position of the side stand.

* * * * *